(12) United States Patent
Kodera

(10) Patent No.: US 11,465,674 B2
(45) Date of Patent: Oct. 11, 2022

(54) STEERING APPARATUS

(71) Applicant: JTEKT CORPORATION, Osaka (JP)

(72) Inventor: Takashi Kodera, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 246 days.

(21) Appl. No.: 16/861,603

(22) Filed: Apr. 29, 2020

(65) Prior Publication Data

US 2020/0361525 A1    Nov. 19, 2020

(30) Foreign Application Priority Data

May 15, 2019 (JP) .............................. JP2019-092348

(51) Int. Cl.
  *B62D 5/04*   (2006.01)
  *B62D 5/00*   (2006.01)

(52) U.S. Cl.
  CPC ............ *B62D 5/0463* (2013.01); *B62D 5/006* (2013.01); *B62D 5/0421* (2013.01)

(58) Field of Classification Search
  None
  See application file for complete search history.

(56) References Cited

U.S. PATENT DOCUMENTS

| 2017/0008557 | A1 | 1/2017 | Mitsumoto |
| 2019/0039647 | A1 | 2/2019 | Tsubaki |
| 2020/0130739 | A1* | 4/2020 | Kodera ................ B62D 5/0463 |
| 2020/0324808 | A1* | 10/2020 | Kodera .................. B62D 6/007 |
| 2020/0361517 | A1* | 11/2020 | Namikawa ........... B62D 15/027 |

FOREIGN PATENT DOCUMENTS

| EP | 3725645 A1 * | 10/2020 | ............. B62D 5/005 |
| EP | 3725645 A1 | 10/2020 | |
| JP | 2014-148299 A | 8/2014 | |

OTHER PUBLICATIONS

Nov. 2, 2020 Extended Search Report issued in European Patent Application No. 20173497.7.

* cited by examiner

*Primary Examiner* — Kevin Hurley
(74) *Attorney, Agent, or Firm* — Oliff PLC

(57) ABSTRACT

A steering apparatus includes: a steering mechanism including a turning shaft; a motor configured to give a drive force to the steering mechanism; and a controller configured to control the motor based on a command value. The controller includes a first computation circuit, a second computation circuit and a third computation circuit. The first computation circuit is configured to compute a shaft force that acts on the turning shaft. The second computation circuit is configured to compute a value indicating the degree of intervention in a steering control by a host controller, such that the value gradually changes with respect to time. The third computation circuit is configured to compute a final shaft force, by reflecting the value indicating the degree of the intervention, in the shaft force.

5 Claims, 9 Drawing Sheets

STEERING APPARATUS

CROSS-REFERENCE TO RELATED APPLICATION

This application claims priority to Japanese Patent Application No. 2019-092348 filed on May 15, 2019, incorporated herein by reference in its entirety.

BACKGROUND

1. Technical Field

The disclosure relates to a steering apparatus.

2. Description of Related Art

There is known a so-called steer-by-wire type steering apparatus in which dynamic power transmission between a steering wheel and turning wheels is mechanically isolated. The steering apparatus includes a reaction motor as a generation source of a steering reaction force that is given to a steering shaft, and a turning motor as a generation source of a turning force by which the turning wheels are turned. When a vehicle is traveling, a control device of the steering apparatus executes a reaction force control to generate the steering reaction force through the reaction motor, and executes a turning control to turn the turning wheels through the turning motor.

In the steer-by-wire type steering apparatus, since the dynamic power transmission between the steering wheel and the turning wheels is mechanically isolated, it is hard to transmit a road surface reaction force that acts on the turning wheels, to the steering wheel. Accordingly, it is hard for a driver to feel a road surface condition as the steering reaction force on driver's hands (sensation in driver's hands) through the steering wheel.

Hence, for example, a steering control device described in Japanese Patent Application Publication No. 2014-148299 computes a feedforward shaft force that is an ideal rack shaft force based on a steering angle and a feedback shaft force that is an estimated shaft force based on state amounts (a lateral acceleration, a turning current and a yaw rate) of the vehicle. The steering control device computes a final shaft force by summing up values resulting from multiplying the feedforward shaft force and the feedback shaft force by predetermined distribution ratios, and controls the reaction motor based on the final shaft force. Since the feedback shaft force reflects a road surface state, the steering reaction force generated by the reaction motor also reflects the road surface state. Accordingly, the driver can feel the road surface state as the steering reaction force.

SUMMARY

There has been performed development of a driving assist system that realizes various driving assist functions for improving safety or convenience of the vehicle. In recent years, there has been actively performed development of an automatic driving system that realizes an automatic driving function by which the system performs driving instead of a driver. A control device (referred to as a "host control device" hereinafter) of the driving assist system or the automatic driving system determines an optimal control method based on the state of the vehicle at that time, and commands control devices of in-vehicle systems to perform individual controls depending on the determined control method. The steering control device controls the drive of the reaction motor and the turning motor, based on a command value that is generated by the host control device.

In the case where the driving assist system or the automatic driving system is equipped in the vehicle, there is a concern described below. For example, the steering reaction force that is generated by the reaction motor exerts influence on behavior of the steering wheel. Therefore, there is sometimes a difference in demand for the reaction force control that is executed by the steering control device, between when manual driving is being performed by the driver and when driving assist or automatic driving is being performed. For example, there can be a difference in the steering reaction force that is generated by the reaction motor, between when the manual driving is being performed by the driver and when the driving assist or the automatic driving is being performed. Because of the difference, when a steering mode of the vehicle is switched between the manual driving and the driving assist or between the manual driving and the automatic driving, there is a fear that the driver has a strangeness feeling, for example, due to a sudden change in the sensation in driver's hands through the steering wheel.

In the case where the driving assist function or the automatic driving function is equipped in an electric power steering apparatus (EPS) in which the torque of a motor is given to a steering mechanism of the vehicle as an assist force, there is the same problem as the problem in the steering control device of the steer-by-wire type steering apparatus.

The disclosure reduces the strangeness feeling of the driver at the time of switching from an automatic steering control to a manual steering control.

An aspect of the disclosure is a steering apparatus. The steering apparatus includes: a steering mechanism including a turning shaft by which a turning wheel is turned; a motor configured to give a drive force to the steering mechanism; and a controller configured to control the motor based on a command value that is computed depending on a steering state. The controller includes a first computation circuit, a second computation circuit and a third computation circuit. The first computation circuit is configured to compute a shaft force to be reflected in the command value, depending on the steering state, the shaft force acting on the turning shaft. The second computation circuit is configured to compute a value indicating the degree of intervention in a steering control by a host controller, such that the value gradually changes with respect to time, by performing a gradual-change process for a value of a distribution command that is generated when the host controller intervenes in the steering control, the host controller being mounted on a vehicle. The third computation circuit is configured to compute a final shaft force to be reflected in the command value, by reflecting the value indicating the degree of the intervention and computed by the second computation circuit, in the shaft force computed by the first computation circuit.

There can be a difference in demand for the drive force that is generated by the motor, between when the host controller intervenes in the steering control and when the host controller does not intervene in the steering control. Therefore, when switching is performed between a state where the host controller intervenes in the steering control and a state where the host controller does not intervene in the steering control, there is a concern that a driver has a strangeness feeling, for example, due to a sudden change in sensation driver's hands through the steering wheel.

In this respect, with the above configuration, for example, when the host controller intervenes in the steering control, the value indicating the degree of the intervention in the steering control by the host controller is computed so as to gradually change with respect to time, through the execution of the gradual-change process for the distribution command by the second computation circuit. Then, the gradually changing value indicating the degree of the intervention is reflected in the shaft force computed by the first computation circuit, by the third computation circuit, and thereby the final shaft force to be reflected in the command value is computed. Therefore, the final shaft force gradually changes depending on the gradually changing value indicating the degree of the intervention. That is, a rapid change in the final shaft force is restrained, and furthermore a rapid change in the command value in which the final shaft force is reflected is restrained. Accordingly, a rapid change in the drive force that is given to the steering mechanism is restrained, and therefore the driver is unlikely to have the strangeness feeling due to the change in the drive force that is given to the steering mechanism.

In the steering apparatus, the second computation circuit may be configured to compute an automatic driving rate, as the value indicating the degree of the intervention in the steering control by the host controller. The third computation circuit may be configured to compute the final shaft force to be reflected in the command value, by reflecting the automatic driving rate or a gain corresponding to the automatic driving rate, in the shaft force computed by the first computation circuit.

In the steering apparatus, the controller may include a fourth computation circuit, a fifth computation circuit, a sixth computation circuit and a seventh computation circuit. The fourth computation circuit may be configured to compute a target rotation angle of a shaft, based on the steering state and the final shaft force computed by the third computation circuit, the shaft rotating depending on an operation of a steering wheel. The fifth computation circuit may be configured to compute a first distribution ratio for a host command value and a second distribution ratio for the target rotation angle computed by the fourth computation circuit, such that the first distribution ratio and the second distribution ratio gradually change with respect to time, by performing a gradual-change process for the value of the distribution command, the host command value being generated when the host controller intervenes in the steering control. The sixth computation circuit may be configured to compute a final target rotation angle of the shaft, using a value obtained from the first distribution ratio and the host command value and a value obtained from the second distribution ratio and the target rotation angle computed by the fourth computation circuit. The seventh computation circuit may be configured to compute a command value component to be reflected in the command value, through a feedback control to cause an actual rotation angle of the shaft to coincide with the final target rotation angle of the shaft computed by the sixth computation circuit.

With the above configuration, for example, when the host controller intervenes in the steering control, rapid changes in the first distribution ratio and the second distribution ratio are restrained, through the execution of the gradual-change process for the distribution command by the fifth computation circuit. Therefore, a rapid change in the final target rotation angle that is used in the sixth computation circuit is restrained, and furthermore a rapid change in the drive force that is given to the steering mechanism is restrained. That is, the drive force that is given to the steering mechanism gradually changes. Accordingly, the driver is unlikely to have the strangeness feeling due to the change in the drive force that is given to the steering mechanism.

In the steering apparatus, the steering mechanism may include a steering shaft that rotates in conjunction with an operation of a steering wheel, dynamic force transmission between the steering wheel and the turning shaft being isolated. The motor may be a reaction motor that generates a steering reaction force as the drive force that is given to the steering shaft, the steering reaction force being a torque in an opposite direction of a steering direction.

In the steering apparatus, the steering mechanism may include a shaft that rotates in conjunction with an operation of a steering wheel and that functions as a dynamic force transmission path between the steering wheel and the turning shaft. The motor may be an assist motor that generates a steering assistance force as the drive force that is given to the shaft or the turning shaft, the steering assistance force being a torque in the same direction as a steering direction.

With the steering apparatus in the disclosure, it is possible to reduce the strangeness feeling of the driver at the time of switching from an automatic steering control to a manual steering control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A first embodiment in which a steering control device is applied to a steer-by-wire type steering apparatus will be described below.

Figure 1:
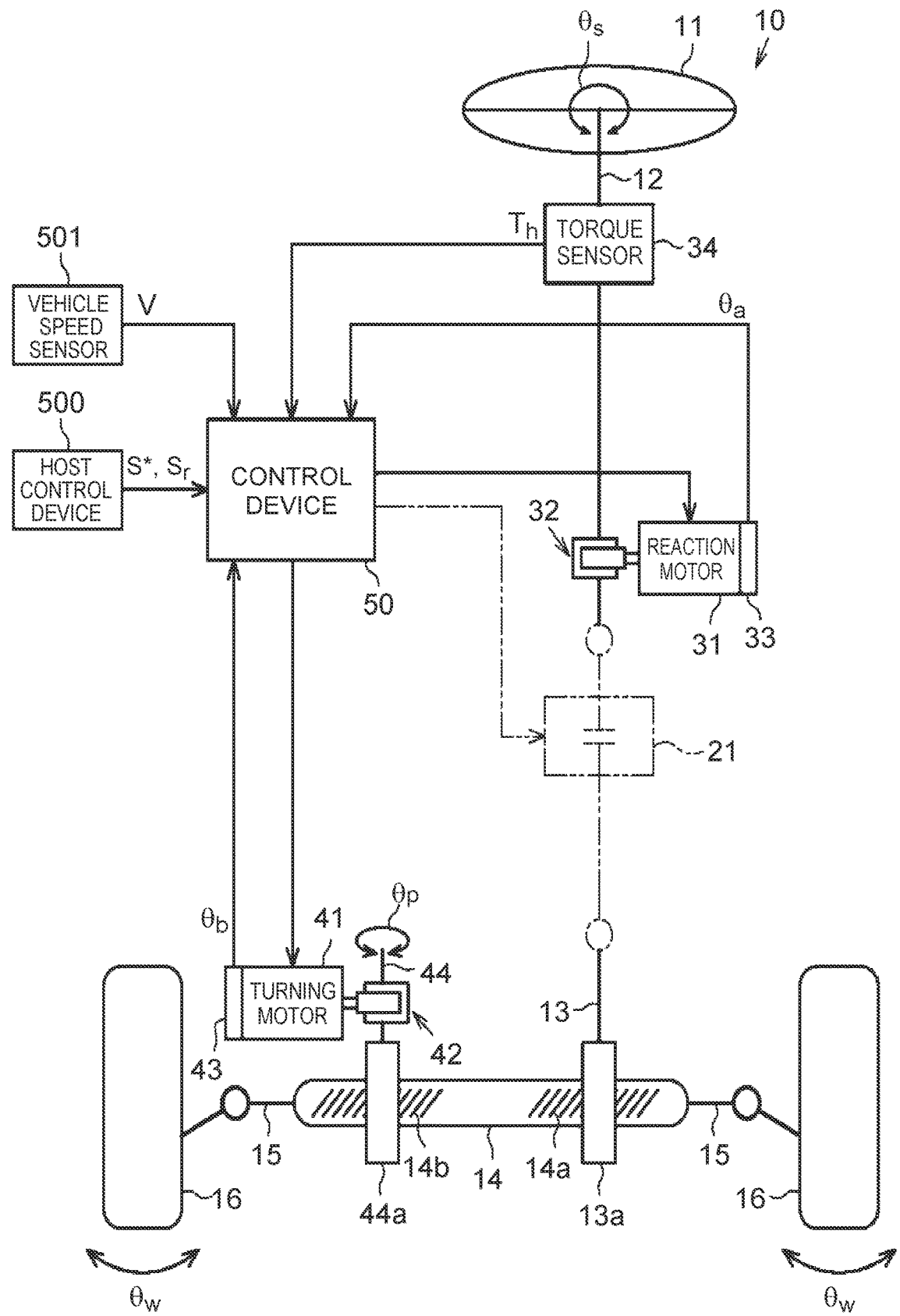
FIG. 1 is a configuration diagram of a steer-by-wire type steering apparatus that is equipped with a first embodiment of a steering control device.

As shown in FIG. 1, a steering apparatus 10 of a vehicle includes a steering shaft 12 that is coupled to a steering wheel 11. The steering shaft 12 constitutes a steering mechanism. Further, the steering apparatus 10 includes a turning shaft 14 that extends along a vehicle width direction (a right-left direction in FIG. 1). Right and left turning wheels 16 are coupled to both ends of the turning shaft 14 through tie rods 15, respectively. A turning angle $\theta_w$ of the turning wheels 16 is altered by a linear motion of the turning shaft 14.

The steering apparatus 10 includes a reaction motor 31, a speed reducer 32, a rotation angle sensor 33 and a torque sensor 34, as a configuration for generating a steering reaction force. Incidentally, the steering reaction force is a force (torque) that acts in an opposite direction of a direction of driver's operation of the steering wheel 11. By giving the steering reaction force to the steering wheel 11, it is possible to give a moderate sensation in driver's hands.

The reaction motor 31 is a generation source of the steering reaction force. As the reaction motor 31, for example, a brushless motor having three phases (U, V and W) is employed. The reaction motor 31 (a rotation shaft of the reaction motor 31, to be exact) is coupled to the steering shaft 12 through the speed reducer 32. The torque of the reaction motor 31 is given to the steering shaft 12 as the steering reaction force.

The rotation angle sensor 33 is provided on the reaction motor 31. The rotation angle sensor 33 detects a rotation angle $\theta_a$ of the reaction motor 31. The rotation angle $\theta_a$ of the reaction motor 31 is used for the computation of a steer angle (steering angle) $\theta_s$. The reaction motor 31 and the steering shaft 12 interlock with each other through the speed reducer 32. Therefore, the rotation angle $\theta_a$ of the reaction motor 31 has a correlation with the rotation angle of the steering shaft 12 and furthermore the steer angle $\theta_s$ that is the rotation angle of the steering wheel 11. Accordingly, it is possible to determine the steer angle $\theta_s$ based on the rotation angle $\theta_a$ of the reaction motor 31.

The torque sensor 34 detects a steering torque $T_h$ that is applied to the steering shaft 12 by a rotation operation of the steering wheel 11. The torque sensor 34 is provided at a portion that is on the steering shaft 12 and that is closer to the steering wheel 11 than the speed reducer 32 is.

The steering apparatus 10 includes a turning motor 41, a speed reducer 42 and a rotation angle sensor 43, as a configuration for generating a turning force that is a dynamic force for turning the turning wheels 16.

The turning motor 41 is a generation source of the turning force. As the turning motor 41, for example, a brushless motor having three phases is employed. The turning motor 41 (a rotation shaft of the turning motor 41, to be exact) is coupled to a pinion shaft 44 through the speed reducer 42. A pinion gear 44a of the pinion shaft 44 engages with a rack gear 14b of the turning shaft 14. The torque of the turning motor 41 is given to the turning shaft 14 through the pinion shaft 44, as the turning force. With the rotation of the turning motor 41, the turning shaft 14 moves along the vehicle width direction (the right-left direction in the figure).

The rotation angle sensor 43 is provided on the turning motor 41. The rotation angle sensor 43 detects a rotation angle $\theta_b$ of the turning motor 41. Incidentally, the steering apparatus 10 includes a pinion shaft 13. The pinion shaft 13 is provided so as to cross the turning shaft 14. A pinion gear 13a of the pinion shaft 13 engages with a rack gear 14a of the turning shaft 14. The reason why the pinion shaft 13 is provided is that the pinion shaft 13 supports the turning shaft 14 within a housing (not illustrated) together with the pinion shaft 44. That is, by a support mechanism (not illustrated) provided in the steering apparatus 10, the turning shaft 14 is supported such that the turning shaft 14 can move along an axial direction of the turning shaft 14, and is pressed toward the pinion shafts 13, 44. Thereby, the turning shaft 14 is supported within the housing. However, there may be provided another support mechanism that supports the turning shaft 14 within the housing without using the pinion shaft 13.

The steering apparatus 10 includes a control device 50. The control device 50 controls the reaction motor 31 and the turning motor 41, based on detection results of various sensors. As the sensors, there is a vehicle speed sensor 501, in addition to the above-described rotation angle sensor 33, torque sensor 34 and rotation angle sensor 43. The vehicle speed sensor 501 is provided in the vehicle, and detects a vehicle speed V that is the traveling speed of the vehicle.

The control device 50 executes a reaction force control to generate the steering reaction force corresponding to the steering torque $T_h$, through a drive control of the reaction motor 31. The control device 50 computes a target steering reaction force based on the steering torque $T_h$ and the vehicle speed V, and computes a target steering angle of the steering wheel 11 based on the computed target steering reaction force, the steering torque $T_h$ and the vehicle speed V. The control device 50 computes a steer angle correction amount through a feedback control of the steer angle $\theta_s$ that is executed such that the actual steer angle $\theta_s$ follows up the target steering angle, and computes a steering reaction force command value by adding the computed steer angle correction amount to the target steering reaction force. The control device 50 supplies an electric current necessary to generate the steering reaction force corresponding to the steering reaction force command value, to the reaction motor 31.

The control device 50 executes a turning control to turn the turning wheels 16 depending on a steering state, through a drive control of the turning motor 41. The control device 50 computes a pinion angle $\theta_p$ that is the actual rotation angle of the pinion shaft 44, based on the rotation angle $\theta_b$ of the turning motor 41 that is detected through the rotation angle sensor 43. The pinion angle $\theta_p$ is a value that reflects the turning angle $\theta_w$ of the turning wheels 16. The control device 50 computes a target pinion angle, using the above-described target steering angle. Then, the control device 50 determines the deviation between the target pinion angle and the actual pinion angle $\theta_p$, and controls electricity supply for the turning motor 41 such that the deviation is eliminated.

The vehicle is sometimes equipped with a driving assist system that assists driver's driving operation for realizing a safe and better driving, or an automatic driving system that realizes an automatic driving function by which the system performs driving instead of the driver. In this case, in the vehicle, a cooperation control between the control device 50 and a control device of another in-vehicle system is performed. The cooperation control is a technology in which control devices of a plurality of kinds of in-vehicle systems control the action of the vehicle in cooperation with each other. For example, the vehicle is equipped with a host control device 500 that integrally controls the respective in-vehicle control devices of the in-vehicle systems. The host control device 500 determines an optimal control method based on the state of the vehicle at that time, and commands the respective control devices to perform individual controls depending on the determined control method.

The host control device 500 intervenes in the steering control by the control device 50. The host control device 500 switches a driving assist control function or automatic driving control function of the host control device 500 between an on-state (enabling) and an off-state (disabling), through an operation of an unillustrated switch that is provided at a driver's seat or the like.

For example, the host control device 500 computes an additional angle command value as a command value S* for causing the vehicle to travel on a target lane. The additional angle command value is a target value of the steering angle (an angle to be added to the current steering angle) that is necessary for the traveling of the vehicle along the lane depending on a traveling state of the vehicle at that time. The control device 50 controls the reaction motor 31 and the turning motor 41, using the command value S* computed by the host control device 500.

Further, the host control device 500 generates a flag as a distribution command $S_r$ for the control device 50. The flag is information indicating whether the driving assist control function or the automatic driving control function is in the on-state or in the off-state. When the driving assist control function or the automatic driving control function is in the on-state, the host control device 500 sets the value of the flag to "1". When the driving assist control function or the automatic driving control function is in the off-state, the host control device 500 sets the value of the flag to "0".

Figure 2:
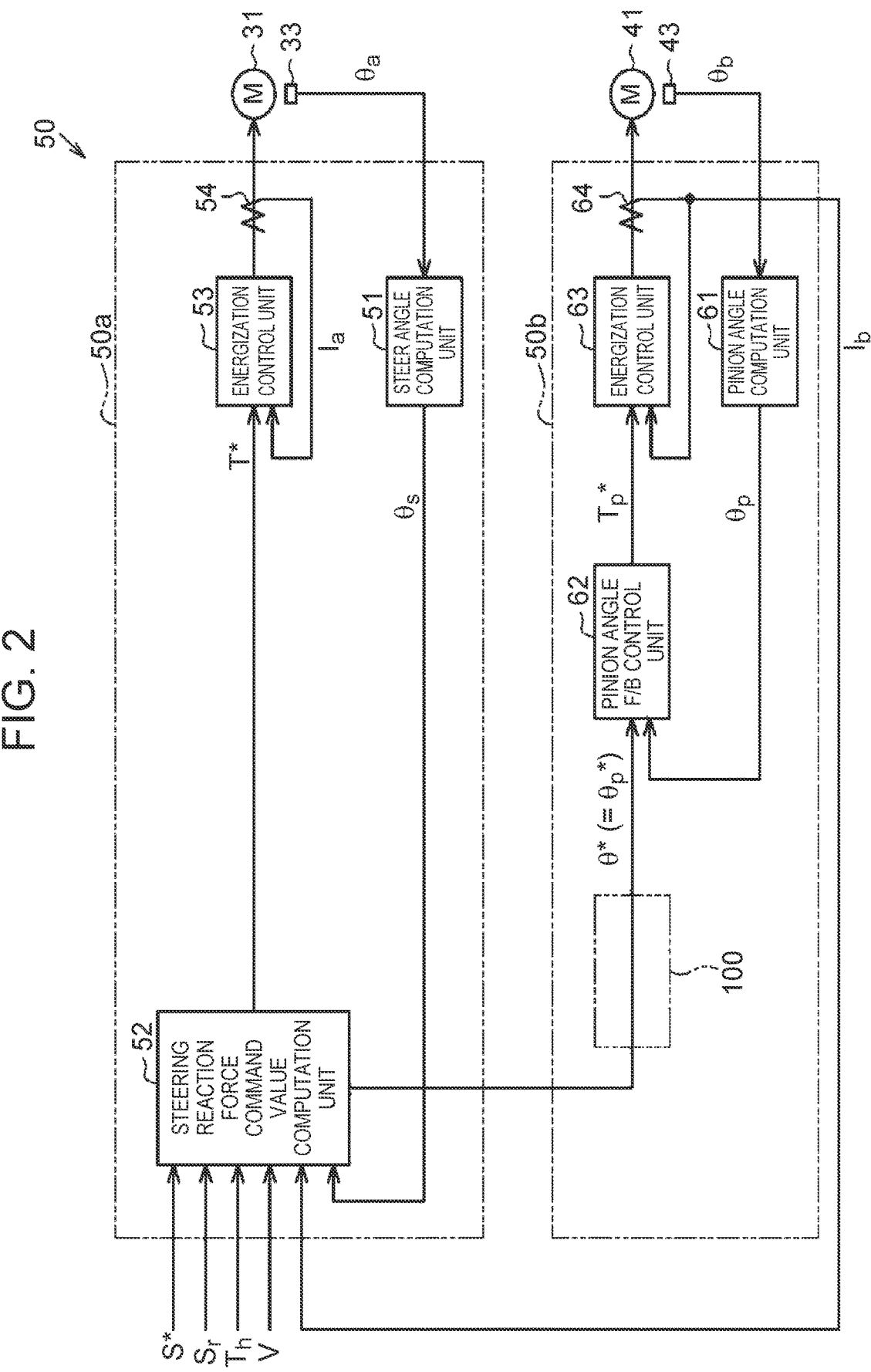
FIG. 2 is a control block diagram of the first embodiment of the steering control device.

Next, the control device 50 will be described in detail. As shown in FIG. 2, the control device 50 includes a reaction force control unit 50a that executes the reaction force control, and a turning control unit 50b that executes the turning control.

The reaction force control unit 50a includes a steer angle computation unit 51, a steering reaction force command value computation unit 52 and an energization control unit 53.

The steer angle computation unit 51 computes the steer angle $\theta_s$ of the steering wheel 11, based on the rotation angle $\theta_a$ of the reaction motor 31 that is detected through the rotation angle sensor 33. The steering reaction force command value computation unit 52 computes a steering reaction force command value T*, based on the steering torque $T_h$, the vehicle speed V and the steer angle $\theta_s$. The steering reaction force command value computation unit 52 computes the steering reaction force command value T* having a larger absolute value, as the absolute value of the steering torque $T_h$ is larger and the vehicle speed V is lower. Incidentally, the steering reaction force command value computation unit 52 computes a target steer angle $\theta$* of the steering wheel 11 in the course of the computation of the steering reaction force command value T*. The steering reaction force command value computation unit 52 will be described later in detail.

The energization control unit 53 supplies an electric power corresponding to the steering reaction force command value T*, to the reaction motor 31. Specifically, the energization control unit 53 computes a current command value for the reaction motor 31, based on the steering reaction force command value T*. Further, the energization control unit 53 detects an actual electric current value $I_a$ that is generated in an electricity supply path to the reaction motor 31, through a current sensor 54 provided on the electricity supply path. The electric current value $I_a$ is the value of the actual electric current that is supplied to the reaction motor 31. Then, the energization control unit 53 determines the deviation between the current command value and the actual electric current value $I_a$, and controls electricity supply for the reaction motor 31 such that the deviation is eliminated (a feedback control of the electric current value $I_a$). Thereby, the reaction motor 31 generates the torque corresponding to the steering reaction force command value T*. It is possible to give a moderate sensation in driver's hands that corresponds to a road surface reaction force.

The turning control unit 50b includes a pinion angle computation unit 61, a pinion angle feedback control unit 62 and an energization control unit 63.

The pinion angle computation unit 61 computes the pinion angle $\theta_p$ that is the actual rotation angle of the pinion shaft 44, based on the rotation angle $\theta_b$ of the turning motor 41 that is detected through the rotation angle sensor 43. The turning motor 41 and the pinion shaft 44 interlock with each other through the speed reducer 42. Therefore, there is a correlation between the rotation angle $\theta_b$ of the turning motor 41 and the pinion angle $\theta_p$. By using this correlation, it is possible to determine the pinion angle $\theta_p$ from the rotation angle $\theta_b$ of the turning motor 41. Further, the pinion shaft 44 engages with the turning shaft 14. Therefore, there is a correlation between the pinion angle $\theta_p$ and the moving amount of the turning shaft 14. That is, the pinion angle $\theta_p$ is a value that reflects the turning angle $\theta_w$ of the turning wheels 16.

The pinion angle feedback control unit 62 takes in the target steer angle $\theta$* computed by the steering reaction force command value computation unit 52, as a target pinion angle $\theta_p$. Further, the pinion angle feedback control unit 62 takes in the actual pinion angle $\theta_p$ computed by the pinion angle computation unit 61. The pinion angle feedback control unit 62 computes a pinion angle command value $T_p$*, through a feedback control (PID control) of the pinion angle $\theta_p$, such that the actual pinion angle $\theta_p$ follows up the target pinion angle $\theta_p$* (which is equal to the target steer angle $\theta$* in the embodiment).

The energization control unit 63 supplies an electric power corresponding to the pinion angle command value $T_p$*, to the turning motor 41. Specifically, the energization control unit 63 computes a current command value for the turning motor 41, based on the pinion angle command value $T_p$*. Further, the energization control unit 63 detects an actual electric current value $I_b$ that is generated in an electricity supply path to the turning motor 41, through a current sensor 64 provided on the electricity supply path. The electric current value $I_b$ is the value of the actual electric current that is supplied to the turning motor 41. Then, the energization control unit 63 determines the deviation between the current command value and the actual electric current value $I_b$, and controls the electricity supply for the turning motor 41 such that the deviation is eliminated (a feedback control of the electric current value $I_b$). Thereby, the turning motor 41 rotates by an angle corresponding to the pinion angle command value $T_p$.

Figure 3:
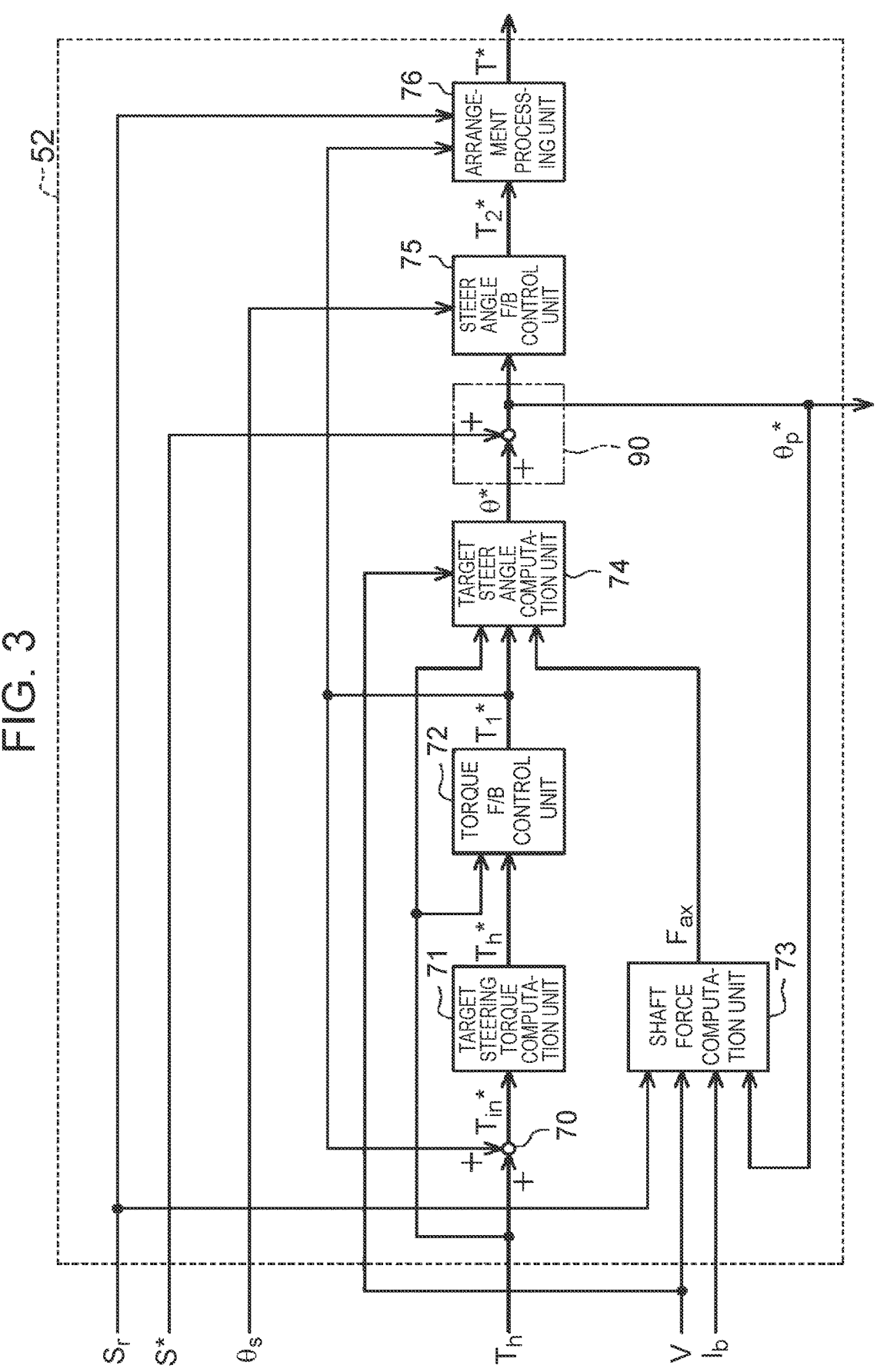
FIG. 3 is a control block diagram of a steering reaction force command value computation unit in the first embodiment.

Next, the steering reaction force command value computation unit 52 will be described in detail. As shown in FIG. 3, the steering reaction force command value computation unit 52 includes an adder 70, a target steering torque computation unit 71, a torque feedback control unit 72, a shaft force computation unit 73, a target steer angle computation unit 74, a steer angle feedback control unit 75 and an arrangement processing unit 76.

The adder 70 computes an input torque $T_{in}$* as a torque that is applied to the steering shaft 12, by adding the steering torque $T_b$ detected through the torque sensor 34 and a first steering reaction force command value $T_1$* computed by the torque feedback control unit 72.

The target steering torque computation unit 71 computes a target steering torque $T_b$* based on the input torque $T_{in}$* computed by the adder 70. The target steering torque $T_b$* is a target value of the steering torque $T_b$ to be applied to the steering wheel 11. The target steering torque computation unit 71 computes the target steering torque $T_b^*$ having a larger absolute value, as the absolute value of the input torque $T_{in}^*$ is larger.

The torque feedback control unit 72 takes in the steering torque $T_b$ detected through the torque sensor 34 and the target steering torque $T_b^*$ computed by the target steering torque computation unit 71. The torque feedback control unit 72 computes the first steering reaction force command value $T_1^*$ through a feedback control (PID control) of the steering torque $T_b$, such that the steering torque $T_b$ detected through the torque sensor 34 follows up the target steering torque $T_h$.

The shaft force computation unit 73 takes in the target steer angle $\theta^*$ computed by the target steer angle computation unit 74, as the target pinion angle $\theta_p$. Further, the shaft force computation unit 73 takes in the electric current value $I_b$ of the turning motor 41 detected through the current sensor 64 and the vehicle speed V detected through the vehicle speed sensor 501. The shaft force computation unit 73 computes a shaft force $F_{ax}$ that acts on the turning shaft 14 through the turning wheels 16, based on the target pinion angle $\theta_p$, the electric current value $I_b$ of the turning motor 41 and the vehicle speed V. The shaft force computation unit 73 will be described later in detail.

The target steer angle computation unit 74 takes in the steering torque $T_b$ detected through the torque sensor 34, the first steering reaction force command value $T_1^*$ computed by the torque feedback control unit 72, the shaft force $F_{ax}$ computed by the shaft force computation unit 73, and the vehicle speed V detected through the vehicle speed sensor 501. The target steer angle computation unit 74 computes the target steer angle $\theta^*$ of the steering wheel 11, based on the taken steering torque $T_b$, first steering reaction force command value $T_1^*$, shaft force $F_{ax}$ and vehicle speed V. Details are shown as follows.

The target steer angle computation unit 74 determines the final input torque $T_{in}^*$ for the steering wheel 11, by subtracting a torque conversion value (a steering reaction force corresponding to the shaft force) resulting from converting the shaft force $F_{ax}$ into a torque from the input torque $T_{in}^*$ that is the total of the first steering reaction force command value $T_1^*$ and the steering torque $T_h$. The target steer angle computation unit 74 computes the target steer angle $\theta^*$ (target steering angle) from the final input torque $T_{in}^*$, based on an ideal model expressed by the following Expression (A). For the ideal model, the steer angle (steering angle) of the steering wheel 11 corresponding to an ideal turning angle depending on the input torque $T_{in}^*$ is previously modeled by an experiment or the like, on the premise of a steering apparatus in which the steering wheel 11 and the turning wheels 16 are mechanically coupled.

$$T_{in}^* = J\theta^{*\prime\prime} + C\theta^{*\prime} + K\theta^* \quad (A)$$

where "J" is an inertia coefficient corresponding to an inertia moment of the steering wheel 11 and the steering shaft 12, "C" is a viscosity coefficient (friction coefficient) corresponding to the friction and the like between the turning shaft 14 and the housing, and "K" is a spring modulus when each of the steering wheel 11 and the steering shaft 12 is regarded as a spring. The viscosity coefficient C and the inertia coefficient J are values depending on the vehicle speed V. Further, "$\theta^{*\prime\prime}$" is a second-order temporal differentiation value of the target steer angle $\theta^*$, and "$\theta^{*\prime}$" is a first-order temporal differentiation value of the target steer angle $\theta^*$.

Incidentally, in the case where the additional angle command value is computed as the command value $S^*$ through the execution of the driving assist control or the automatic driving control by the host control device 500, the command value $S^*$ is added to the target steer angle $\theta^*$ computed by the target steer angle computation unit 74. The final target steer angle $\theta^*$ after the addition of the command value $S^*$ is supplied to each of the shaft force computation unit 73 and the steer angle feedback control unit 75.

The steer angle feedback control unit 75 takes in the steer angle $\theta_s$ computed by the steer angle computation unit 51 and the target steer angle $\theta^*$ computed by the target steer angle computation unit 74. The steer angle feedback control unit 75 computes a second steering reaction force command value $T_2^*$ through the feedback control of the steer angle $\theta_s$, such that the actual steer angle $\theta_s$ computed by the steer angle computation unit 51 follows up the target steer angle $\theta^*$.

The arrangement processing unit 76 takes in the first steering reaction force command value $T_1^*$ computed by the torque feedback control unit 72, the second steering reaction force command value $T_2^*$ computed by the steer angle feedback control unit 75, and the distribution command $S_r$ computed by the host control device 500. The arrangement processing unit 76 computes the steering reaction force command value $T^*$ based on the first steering reaction force command value $T_1^*$ and the second steering reaction force command value $T_2^*$, depending on the distribution command $S_r$. As the arrangement processing unit 76, one of three configurations (a1) to (a3) described below is employed.

(a1) The arrangement processing unit 76 sets one of the first steering reaction force command value $T_1^*$ and the second steering reaction force command value $T_2^*$, as the steering reaction force command value $T^*$, based on the value of the flag as the distribution command $S_r$. When the value of the flag as the distribution command $S_r$ is "0", the arrangement processing unit 76 sets the first steering reaction force command value $T_1^*$ as the final steering reaction force command value $T^*$. When the value of the flag as the distribution command $S_r$ is "1" (when the value of the flag is not "0", to be exact), the arrangement processing unit 76 sets the second steering reaction force command value $T_2^*$ as the steering reaction force command value $T^*$.

(a2) The arrangement processing unit 76 computes the steering reaction force command value $T^*$ by adding the second steering reaction force command value $T_2^*$ to the first steering reaction force command value $T_1^*$, or sets the first steering reaction force command value $T_1^*$ as the steering reaction force command value $T^*$ with no change, based on the value of the flag as the distribution command $S_r$. When the value of the flag as the distribution command $S_r$ is "0", the arrangement processing unit 76 sets the first steering reaction force command value $T_1^*$ as the steering reaction force command value $T^*$ with no change. When the value of the flag as the distribution command $S_r$ is "1", the arrangement processing unit 76 computes the steering reaction force command value $T^*$ by summing up the first steering reaction force command value $T_1^*$ and the second steering reaction force command value $T_2^*$.

(a3) First, the arrangement processing unit 76 computes a first distribution ratio for the first steering reaction force command value $T_1^*$ and a second distribution ratio for the second steering reaction force command value $T_2^*$, depending on the value of the flag as the distribution command $S_r$. The first distribution ratio and the second distribution ratio may be set in consideration of a state variable that reflects a vehicle behavior, a road surface state or a steering state. Next, the arrangement processing unit 76 computes the steering reaction force command value $T^*$ by summing up a value resulting from multiplying the first steering reaction force command value $T_1^*$ by the first distribution ratio and a value resulting from multiplying the second steering reaction force command value $T_2^*$ by the second distribution ratio.

Figure 4:
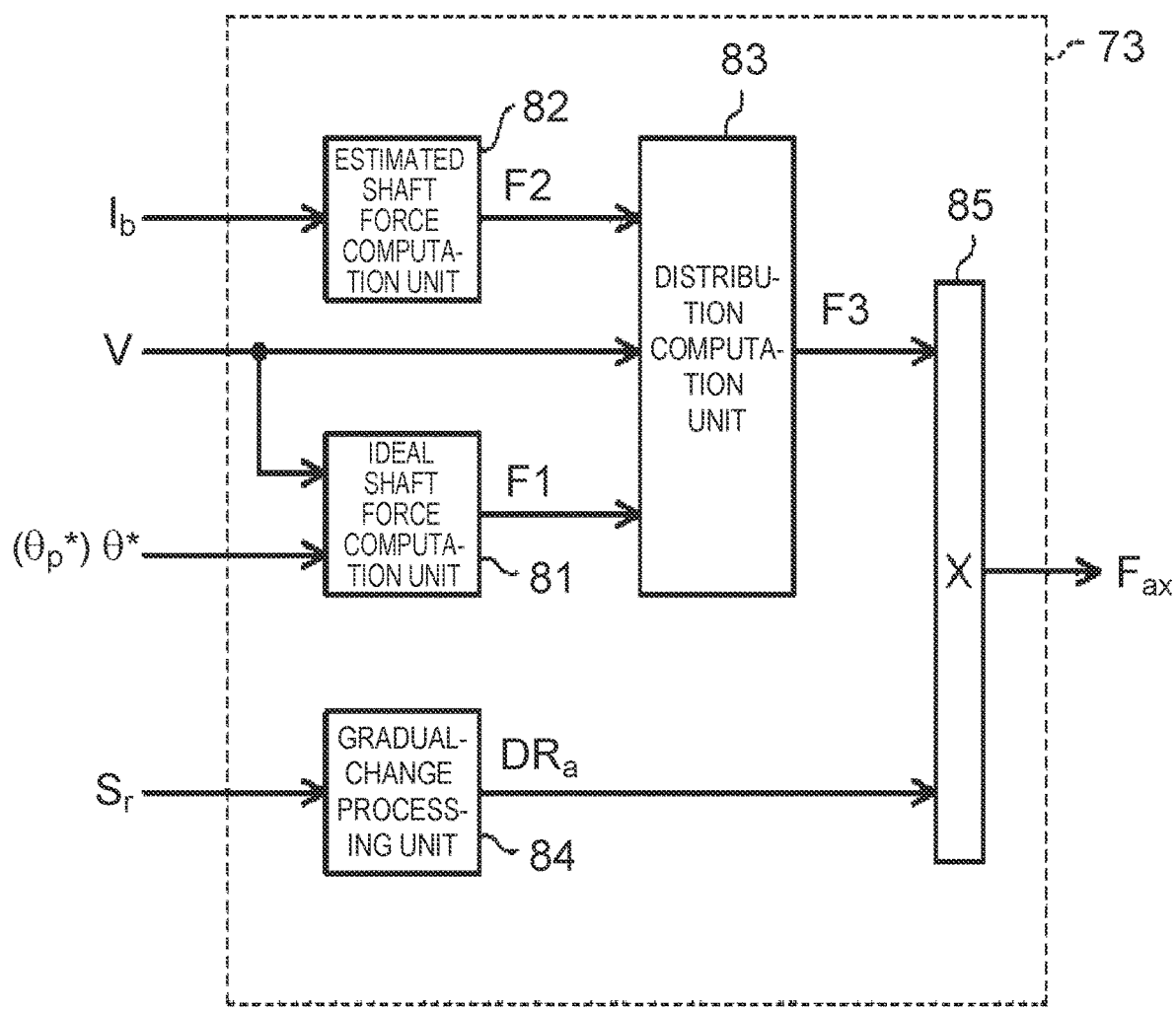
FIG. 4 is a control block diagram of a shaft force computation unit in the first embodiment.

Next, the shaft force computation unit 73 will be described in detail. As shown in FIG. 4, the shaft force computation unit 73 includes an ideal shaft force computation unit 81, an estimated shaft force computation unit 82, a distribution computation unit 83, a gradual-change processing unit 84 and a multiplier 85.

The ideal shaft force computation unit 81 computes an ideal shaft force F1 that is an ideal value of the shaft force that acts on the turning shaft 14 through the turning wheels 16, based on the target pinion angle $\theta_p^*$ and the vehicle speed V. The ideal shaft force computation unit 81 computes the ideal shaft force F1, using an ideal shaft force map stored in an unillustrated storage device of the control device 50. The ideal shaft force F1 is set to a value having a larger absolute value, as the absolute value of the target pinion angle $\theta_p^*$ (or a target turning angle obtained by multiplying the target pinion angle $\theta_p^*$ by a predetermined conversion factor) increases and the vehicle speed V is lower. It is not always necessary to consider the vehicle speed V.

The estimated shaft force computation unit 82 computes an estimated shaft force F2 that acts on the turning shaft 14, based on the electric current value $I_b$ of the turning motor 41. A disturbance corresponding to a road surface state (the frictional resistance of the road surface) acts on the turning wheels 16, and thereby the difference between the target pinion angle $\theta_p^*$ and the actual pinion angle $\theta_p$ is generated, so that the electric current value $I_b$ of the turning motor 41 changes. That is, the electric current value $I_b$ of the turning motor 41 reflects the actual road surface reaction force that acts on the turning wheels 16. Therefore, it is possible to compute the shaft force that reflects the influence of the road surface state, based on the electric current value $I_b$ of the turning motor 41. The estimated shaft force F2 is determined by multiplying the electric current value $I_b$ of the turning motor 41 by a gain that is a coefficient depending on the vehicle speed V.

The distribution computation unit 83 individually sets a distribution ratio (gain) for the ideal shaft force F1 and a distribution ratio for the estimated shaft force F2. The distribution computation unit 83 computes a mixed shaft force F3 by summing up values resulting from multiplying the ideal shaft force F1 and the estimated shaft force F2 by the individually set distribution ratios respectively. The distribution ratio is set depending on various state variables that reflect the vehicle behavior, the road surface state or the steering state.

The gradual-change processing unit 84 takes in the flag as the distribution command $S_r$ generated by the host control device 500. The gradual-change processing unit 84 computes an automatic driving rate $DR_a$ by performing a gradual-change process (a process for gradual change) with respect to time for the value of the flag as the distribution command $S_r$ ("0" or "1" in the embodiment). For example, when the driving assist control function or the automatic driving control function is switched from the off-state to the on-state, the host control device 500 switches the value of the flag as the distribution command $S_r$, from "0" to "1". At this time, the gradual-change processing unit 84 gradually changes the value of the automatic driving rate $DR_a$ from "0" to "1", for example, on a "0.1" basis.

Incidentally, the automatic driving rate $DR_a$ is a value indicating the degree of involvement in the driving of the vehicle by the system (the degree of intervention in the steering control by the host control device 500 in the embodiment). The degree of the involvement in the driving by the system increases as the driving assist system is complicated or enhanced with enhancement of technology level. For example, when the automatic driving rate $DR_a$ is 100%, the system fully performs the driving instead of the driver. Conversely, when the automatic driving rate $DR_a$ is 0%, the driver performs all of the recognition of traveling environment, the judgement of danger, and the driving operation (steering, acceleration, deceleration and the like) of the vehicle.

As the gradual-change processing unit 84, one of two configurations (b1), (b2) described below is employed.

(b1) The gradual-change processing unit 84 has a so-called change amount guard function with respect to time, which is a function to limit the change amount of the value of the flag as the distribution command $S_r$ per unit time to a predetermined limit value. The gradual-change processing unit 84 may alter the limit value depending on steering speed, target steering speed, steering torque or steering torque differentiation value.

(b2) As the gradual-change processing unit 84, a low-pass filter is employed. The low-pass filter may alter cutoff frequency depending on the steering speed, the target steering speed, the steering torque or the steering torque differentiation value.

The multiplier 85 computes the shaft force $F_{ax}$ by multiplying the mixed shaft force F3 computed by the distribution computation unit 83 and the automatic driving rate $DR_a$ computed by the gradual-change processing unit 84. Accordingly, with the first embodiment, the following operations and effects can be obtained.

There can be a difference in demand for the steering reaction force (drive force) that is generated by the reaction motor 31, between when the host control device 500 intervenes in the steering control and when the host control device 500 does not intervene in the steering control. In this case, when the driving assist control function or the automatic driving control function is switched between the on-state and the off-state, there is a concern that the driver has a strangeness feeling, for example, due to a sudden change in sensation driver's hands through the steering wheel.

In this point, the shaft force computation unit 73 in the embodiment is provided with the gradual-change processing unit 84 that performs the gradual-change process with respect to time for the distribution command $S_r$ generated by the host control device 500. Then, the shaft force computation unit 73 computes the final shaft force $F_{ax}$ by multiplying the mixed shaft force F3 computed by the distribution computation unit 83 by the automatic driving rate $DR_a$ computed through the gradual-change process by the gradual-change processing unit 84.

Therefore, when the driving assist control function or the automatic driving control function is switched between the on-state and the off-state, a rapid change in the final shaft force $F_{ax}$ is restrained through the execution of the gradual-change process for the distribution ratio $S_r$ by the gradual-change processing unit 84. That is, rapid changes in the target steer angle $\theta^*$ (target pinion angle $\theta_p^*$), the second steering reaction force command value $T_2^*$, the steering reaction force command value $T^*$ and furthermore the steering reaction force that is given to the steering wheel 11 are restrained. Accordingly, the driver is unlikely to have a strangeness feeling due to the change in the steering reaction force. Further, it is possible to smoothly perform switching between manual driving and driving assist or switching between manual driving and automatic driving.

Next, a second embodiment of the steering control device will be described. Basically, the embodiment has the same configuration as the first embodiment shown in FIG. 1 to FIG. 4. The embodiment is different from the first embodiment in the configuration of the shaft force computation unit 73.

Figure 5:
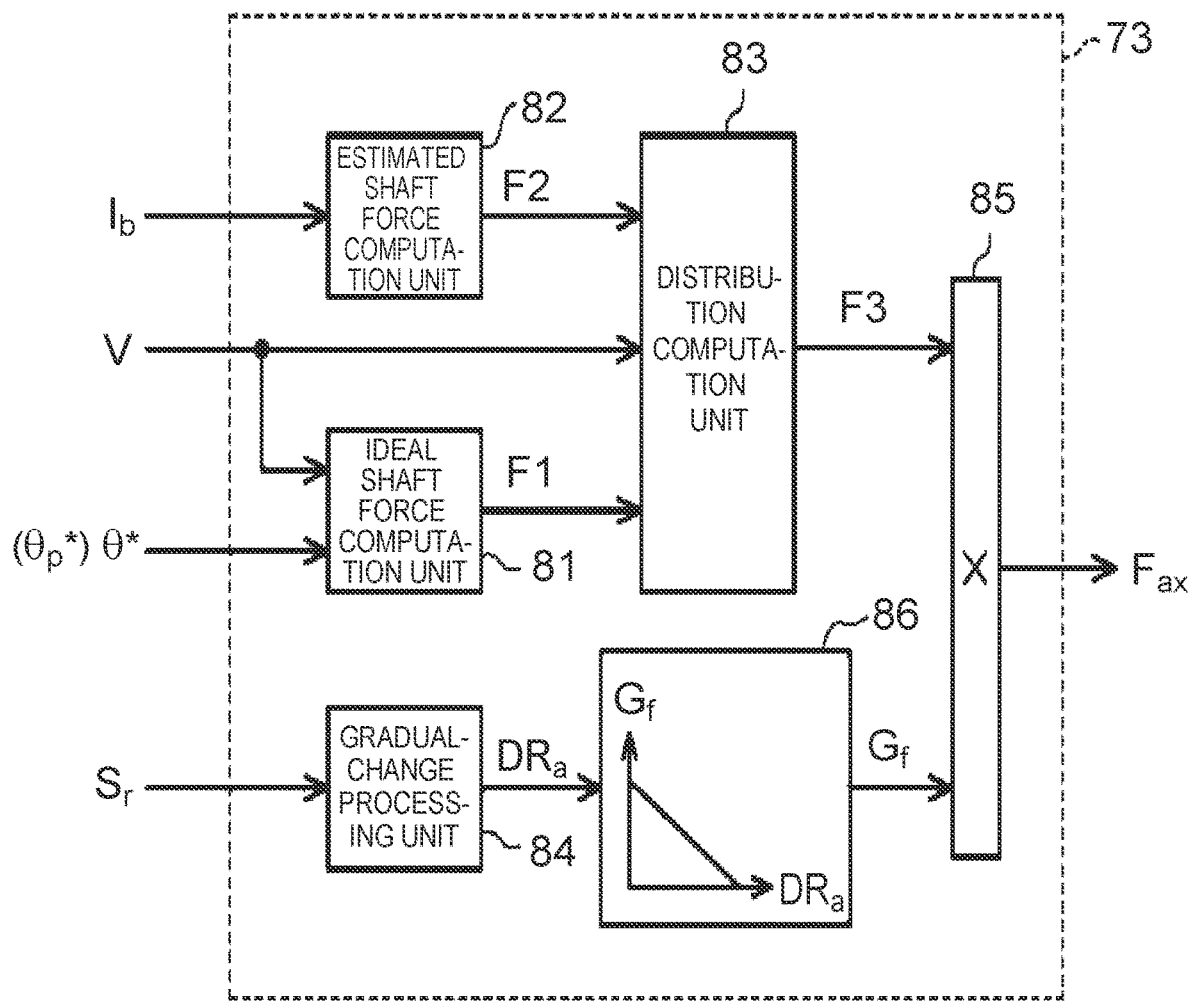
FIG. 5 is a control block diagram of a shaft force computation unit in a second embodiment of the steering control device.

As shown in FIG. 5, the shaft force computation unit 73 includes a gain computation unit 86, in addition to the ideal shaft force computation unit 81, the estimated shaft force computation unit 82, the distribution computation unit 83, the gradual-change processing unit 84 and the multiplier 85. The gain computation unit 86 is provided on a computation path between the gradual-change processing unit 84 and the multiplier 85. The gain computation unit 86 computes a gain $G_f$ for the mixed shaft force F3 computed by the distribution computation unit 83, based on the automatic driving rate $DR_a$ computed by the gradual-change processing unit 84. The gain $G_f$ is computed from a standpoint of a finer adjustment of the mixed shaft force F3 and furthermore the final shaft force $F_{ax}$, depending on a product specification and the like. For example, the gain computation unit 86 computes the gain $G_f$ having a smaller value as the value of the automatic driving rate $DR_a$ is larger. The multiplier 85 computes the final shaft force $F_{ax}$ by multiplying the mixed shaft force F3 computed by the distribution computation unit 83 and the gain $G_f$ computed by the gain computation unit 86.

Accordingly, with the second embodiment, it is possible to obtain the following effects, in addition to the effects in the first embodiment. The final shaft force $F_{ax}$ is obtained by multiplying the mixed shaft force F3 by the gain $G_f$ corresponding to the automatic driving rate $DR_a$. It is possible to perform a finer adjustment of the shaft force $F_{ax}$, by adjusting the change characteristic of the gain $G_f$ for the automatic driving rate $DR_a$. Further, it is possible to compute a more appropriate shaft force $F_{ax}$.

Next, a third embodiment of the steering control device will be described. Basically, the embodiment has the same configuration as the first embodiment shown in FIG. 1 to FIG. 4, but is different from the first embodiment in the configuration of the steering reaction force command value computation unit 52. The embodiment may be applied to the second embodiment.

As shown by a two-dot chain line in FIG. 3, in the steering reaction force command value computation unit 52, an arrangement processing unit 90 is provided on a computation path between the target steer angle computation unit 74 and the steer angle feedback control unit 75. The arrangement processing unit 90 takes in the target steer angle θ* computed by the target steer angle computation unit 74, the command value S* (the additional angle command value in the embodiment) computed by the host control device 500, and the distribution command $S_r$. The arrangement processing unit 90 computes the final target steer angle θ* based on the target steer angle θ* and the command value S*, depending on the distribution command $S_r$.

Figure 6:
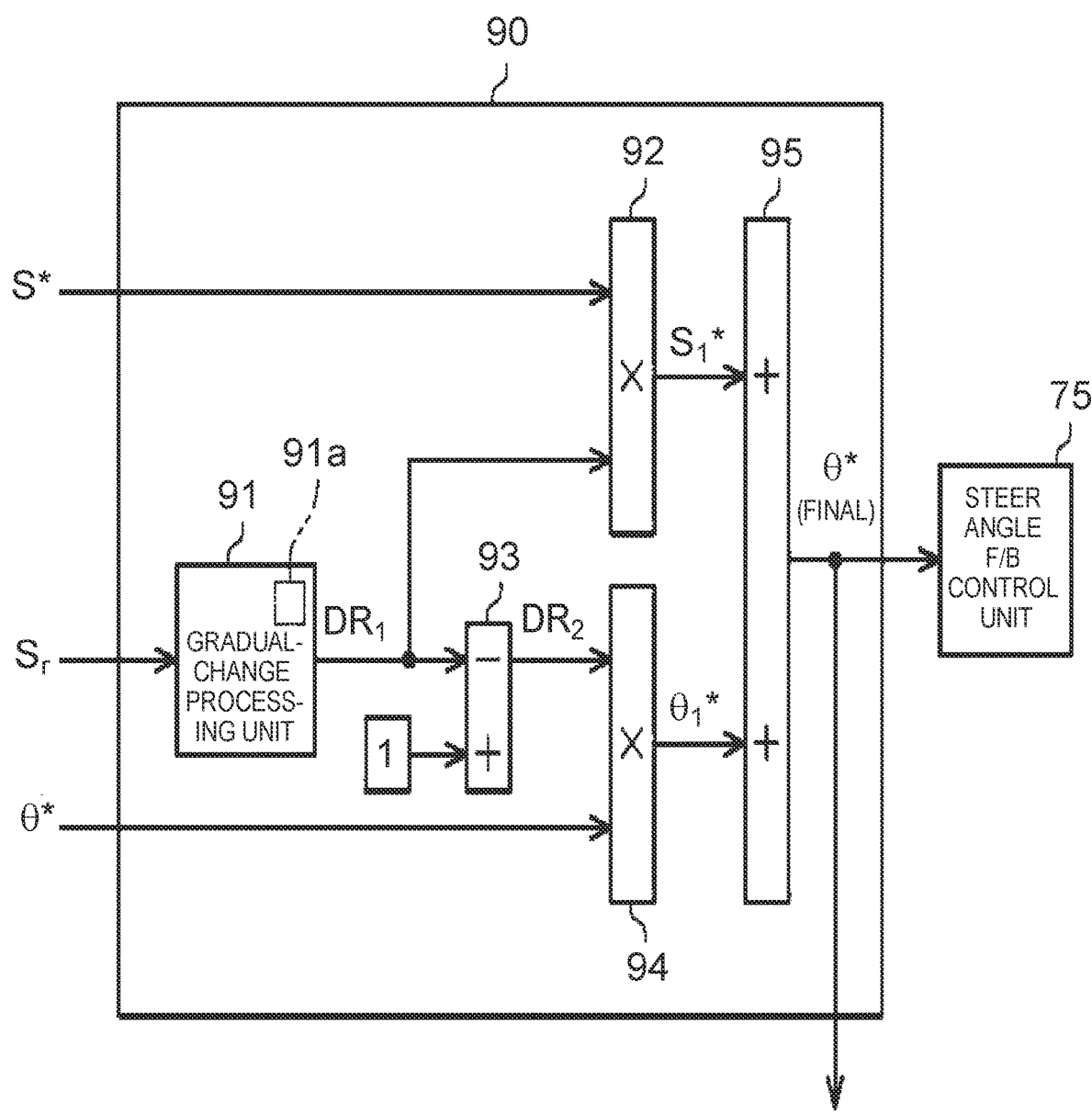
FIG. 6 is a control block diagram of an arrangement processing unit in a third embodiment of the steering control device.

As shown in FIG. 6, the arrangement processing unit 90 includes a gradual-change processing unit 91, a multiplier 92, a subtractor 93, a multiplier 94 and an adder 95. The gradual-change processing unit 91 takes in the flag as the distribution command $S_r$ generated by the host control device 500. The gradual-change processing unit 91 computes a distribution ratio $DR_1$ by performing a gradual-change process with respect to time for the value ("0" or "1" in the embodiment) of the flag as the distribution command $S_r$. The distribution ratio $DR_1$ is a distribution ratio for the command value S* computed by the host control device 500. Further, the distribution ratio $DR_1$ can be regarded as an automatic driving rate indicating the degree of the involvement in the driving of the vehicle by the system (the degree of the intervention in the steering control by the host control device 500 in the embodiment).

The multiplier 92 computes a command value $S_1$* corresponding to the distribution ratio $DR_1$, by the multiplying the command value S* by the distribution ratio $DR_1$. The subtractor 93 computes a distribution ratio $DR_2$ by subtracting the value of the distribution ratio $DR_1$ from "1", which is a fixed value stored in the storage device of the control device 50. Therefore, when the value of the distribution ratio $DR_1$ is "1 (100%)", the value of the distribution ratio $DR_2$ is "0 (0%)". When the value of the distribution ratio $DR_1$ is "0", the value of the distribution ratio $DR_2$ is "1". The distribution ratio $DR_2$ is a distribution ratio for the target steer angle θ* computed by the target steer angle computation unit 74.

The multiplier 94 computes a target steer angle $θ_1$* corresponding to the distribution ratio $DR_2$, by multiplying the target steer angle θ* computed by the target steer angle computation unit 74 by the distribution ratio $DR_2$. The adder 95 computes the final target steer angle θ* that is used in the steer angle feedback control unit 75, by adding the command value $S_1$* corresponding to the distribution ratio $DR_1$ and computed by the multiplier 92 and the target steer angle $θ_1$* corresponding to the distribution ratio $DR_2$ and computed by the multiplier 94.

Accordingly, with the third embodiment, it is possible to obtain the following effects, in addition to the effects in the first embodiment. The arrangement processing unit 90 computes the final target steer angle θ* that is used in the steer angle feedback control unit 75, by summing up the value resulting from multiplying the command value S* by the distribution ratio $DR_1$ based on the distribution command $S_r$ from the host control device 500 and the value resulting from multiplying the target steer angle θ* computed by the target steer angle computation unit 74 by the distribution ratio $DR_2$ based on the distribution ratio $DR_1$. Further, the arrangement processing unit 90 is provided with the gradual-change processing unit 91 that performs the gradual-change process with respect to time for the distribution command $S_r$ from the host control device 500.

Therefore, when the driving assist control function or the automatic driving control function is switched between the on-state and the off-state, rapid changes in the two distribution ratios $DR_1$, $DR_2$ are restrained through the execution of the gradual-change process for the distribution command $S_r$ by the gradual-change processing unit 91. Therefore, a rapid change in the final target steer angle θ* that is used in the steer angle feedback control unit 75 is restrained, and furthermore a rapid change in the steering reaction force that is given to the steering wheel 11 is restrained. Accordingly, the steering reaction force that is given to the steering wheel 11 gradually changes, and thereby the driver is unlikely to have the strangeness feeling due to the change in the steering reaction force. Further, it is possible to smoothly perform the switching between the manual driving and the driving assist or the switching between the manual driving and the automatic driving.

Next, a fourth embodiment of the steering control device will be described. Basically, the embodiment has the same configuration as the first embodiment shown in FIG. 1 to FIG. 4, but is different from the first embodiment in the configuration of the steering reaction force command value computation unit 52. The embodiment may be applied to the second embodiment and the third embodiment.

As shown by a two-dot chain line in FIG. 2, the turning control unit 50b is provided with an arrangement processing unit 100. The arrangement processing unit 100 is provided on a computation path between the steering reaction force command value computation unit 52 of the reaction force control unit 50a and the pinion angle feedback control unit 62 of the turning control unit 50b. The arrangement processing unit 100 takes in the target steer angle θ* computed by the target steer angle computation unit 74 of the steering reaction force command value computation unit 52 shown in FIG. 3, as the target pinion angle $θ_p*$. Further, the arrangement processing unit 100 takes in the command value S* (the additional angle command value in the embodiment) computed by the host control device 500, and the distribution command $S_r$. The arrangement processing unit 100 computes the final target steer angle θ* based on the target pinion angle $θ_p*$ and the command value S*, depending on the distribution command $S_r$.

Figure 7:
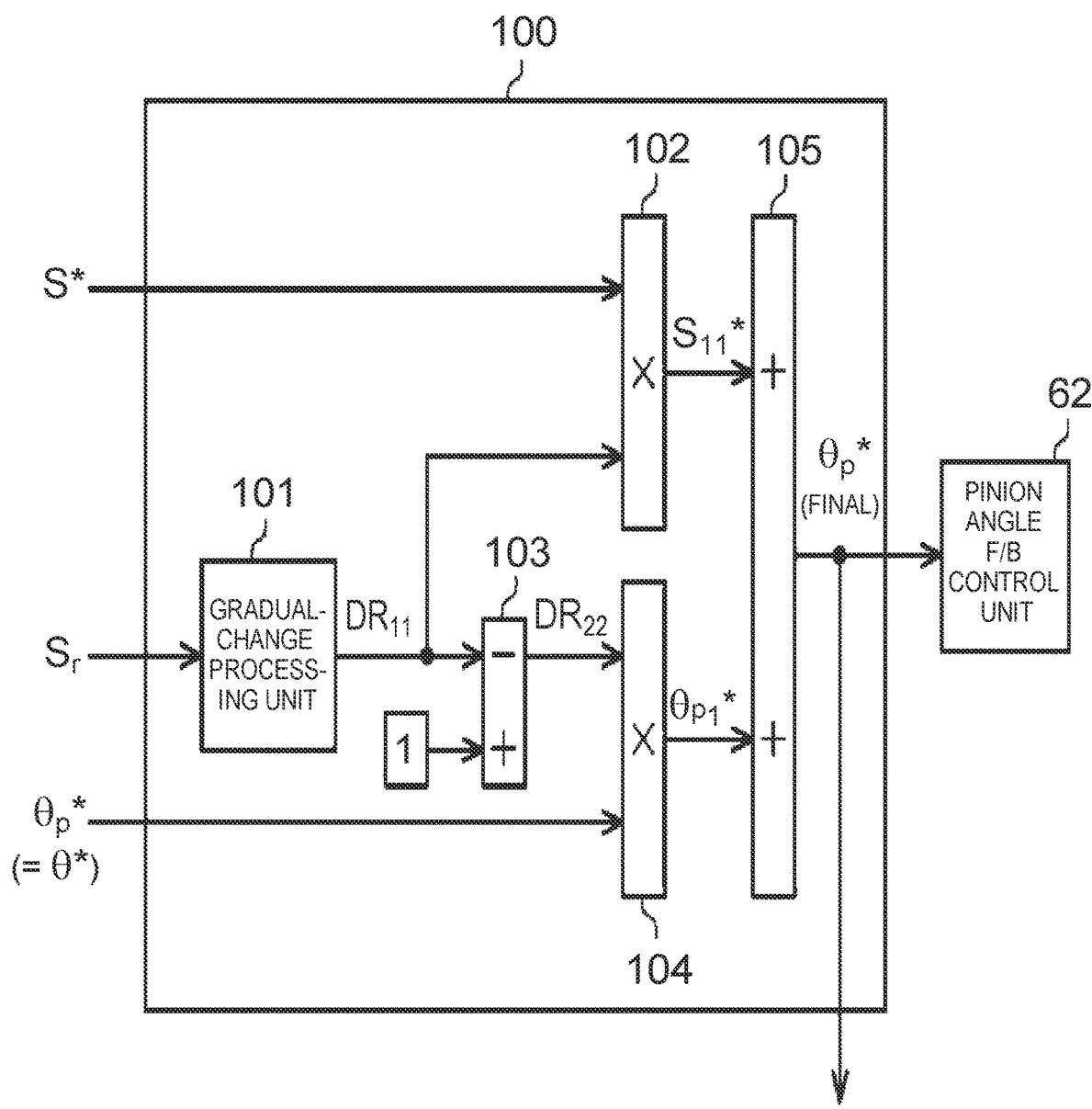
FIG. 7 is a control block diagram of an arrangement processing unit in a fourth embodiment of the steering control device.

As shown in FIG. 7, the arrangement processing unit 100 includes a gradual-change processing unit 101, a multiplier 102, a subtractor 103, a multiplier 104 and an adder 105. The gradual-change processing unit 101 takes in the flag as the distribution command $S_r$ generated by the host control device 500. The gradual-change processing unit 101 computes a distribution ratio $DR_{11}$ by performing a gradual-change process with respect to time for the value ("0" or "1" in the embodiment) of the flag as the distribution command $S_r$. The distribution ratio $DR_{11}$ is a distribution ratio for the command value S* computed by the host control device 500. Further, the distribution ratio $DR_{11}$ can be regarded as an automatic driving rate indicating the degree of the involvement in the driving of the vehicle by the system (the degree of the intervention in the steering control by the host control device 500 in the embodiment).

The multiplier 102 computes a command value $S_{11}*$ corresponding to the distribution ratio $DR_{11}$, by the multiplying the command value S* by the distribution ratio $DR_{11}$. The subtractor 103 computes a distribution ratio $DR_{22}$ by subtracting the value of the distribution ratio $DR_1$ from "1", which is a fixed value stored in the storage device of the control device 50. Therefore, when the value of the distribution ratio $DR_{11}$ is "1 (100%)", the value of the distribution ratio $DR_{22}$ is "0 (0%)". When the value of the distribution ratio $DR_{11}$ is "0", the value of the distribution ratio $DR_{22}$ is "1".

The multiplier 104 computes a target pinion angle $θ_{p1}*$ corresponding to the distribution ratio $DR_{22}$, by multiplying the target pinion angle $θ_p*$ (which is equal to the target steer angle θ* in the embodiment) computed by the target steer angle computation unit 74 (see FIG. 3) by the distribution ratio $DR_{22}$.

The adder 105 computes the final target pinion angle $θ_p*$ that is used in the pinion angle feedback control unit 62, by adding the command value $S_{11}*$ corresponding to the distribution ratio $DR_{11}$ and computed by the multiplier 102 and the target pinion angle $θ_{p1}*$ corresponding to the distribution ratio $DR_{22}$ and computed by the multiplier 104.

Accordingly, with the fourth embodiment, it is possible to obtain the following effects, in addition to the effects in the first embodiment. The arrangement processing unit 100 computes the final target pinion angle $θ_p*$ that is used in the pinion angle feedback control unit 62, by summing up the value resulting from multiplying the command value S* by the distribution ratio $DR_{11}$ based on the distribution command $S_r$ from the host control device 500 and the value resulting from multiplying the target pinion angle $θ_p*$ from the target steer angle computation unit 74 by the distribution ratio $DR_{22}$ based on the distribution ratio $DR_{11}$. Further, the arrangement processing unit 100 is provided with the gradual-change processing unit 101 that performs the gradual-change process with respect to time for the distribution command $S_r$ from the host control device 500.

Therefore, when the driving assist control function or the automatic driving control function is switched between the on-state and the off-state, rapid changes in the two distribution ratios $DR_{11}$, $DR_{22}$ are restrained through the execution of the gradual-change process for the distribution command $S_r$ by the gradual-change processing unit 101. Therefore, a rapid change in the final target pinion angle $θ_p*$ that is used in the pinion angle feedback control unit 62 is restrained, and furthermore a rapid change in the turning angle $θ_w$ is restrained. Accordingly, the turning angle $θ_w$ of the turning wheels 16 gradually changes, and thereby the driver is unlikely to have a strangeness feeling due to the change in the turning angle θ. Further, it is possible to smoothly perform the switching between the manual driving and the driving assist or the switching between the manual driving and the automatic driving.

Next, a fifth embodiment of the steering control device will be described. The embodiment is different from the third embodiment in the action of the gradual-change processing unit 91 shown in FIG. 6.

The steering wheel 11 is provided, such that the steering wheel 11 can move between an operation position suitable for an operation of the steering wheel 11 and a predetermined storage position, through an action of an unillustrated drive mechanism. The action of the drive mechanism is controlled by the control device 50.

When it is recognized that the automatic driving control function has been switched from the off-state to the on-state through the operation of the switch provided at the driver's seat or the like, the control device 50 withdraws the steering wheel 11 from the operation position to the storage position, through the drive mechanism. Conversely, when it is recognized that the automatic driving control function has been switched from the on-state to the off-state through the operation of the switch provided at the driver's seat or the like, the control device 50 returns the steering wheel 11 from the storage position to the operation position, through the drive mechanism.

When the automatic driving control is being executed, the control device 50 executes the turning control to turn the turning wheels 16, and does not execute the reaction force control to generate the steering reaction force through the reaction motor 31. That is, when the automatic driving is being performed, the turning wheels 16 are automatically turned, but the steering wheel 11 does not act.

When it is recognized that the automatic driving control function has been switched from the off-state to the on-state based on the distribution command $S_r$ from the host control device 500, the arrangement processing unit 90 forcibly set "0" as the value of the target steer angle θ* that is supplied to the steer angle feedback control unit 75. The arrangement processing unit 90 sets "0" as the value of the target steer angle θ* that is supplied to the steer angle feedback control unit 75, for example, by multiplying the final target steer angle θ* computed by the adder 95, by a value "0" as a coefficient.

To the shaft force computation unit 73 (see FIG. 3) and the pinion angle feedback control unit 62 (see FIG. 2), the arrangement processing unit 90 supplies the final target steer angle θ* computed by the adder 95, as the target pinion angle $\theta_p^*$, with no change. Thereby, the turning wheels 16 perform turning action in accordance with the target pinion angle $\theta_p^*$.

When it is recognized that the automatic driving control function has been switched from the on-state to the off-state based on the distribution command $S_r$ from the host control device 500, the arrangement processing unit 90 supplies the target steer angle $\theta^*$ computed by the adder 95, to the steer angle feedback control unit 75. Naturally, the target steer angle $\theta^*$ computed by the adder 95 is supplied as the target pinion angle $\theta_p^*$, also to the shaft force computation unit 73 and the pinion angle feedback control unit 62.

Since the storage structure for the steering wheel 11 is employed, the following configuration is employed as the gradual-change processing unit 91 of the arrangement processing unit 90. As shown by a two-dot chain line in FIG. 6, the gradual-change processing unit 91 includes a counter 91a. When it is recognized that the automatic driving control function has been switched from the on-state to the off-state based on the distribution command $S_r$ from the host control device 500, the gradual-change processing unit 91 actuates the counter 91a. Further, when it is recognized that the automatic driving control function has been switched from the on-state to the off-state based on the distribution command $S_r$ from the host control device 500, the gradual-change processing unit 91 switches from an execution state of executing the gradual-change process for the value of the flag as the distribution command $S_r$ to a wait state of waiting for execution start of the gradual-change process for the value of the flag as the distribution command $S_r$.

When the time measured through the counter 91a reaches a predetermined wait time, the gradual-change processing unit 91 starts the execution of the gradual-change process for the value of the flag as the distribution command $S_r$. The wait time is set on the basis of a time necessary for the steering wheel 11 to move from the storage position to the operation position. When the gradual-change processing unit 91 is maintained in the wait state, the value of the flag as the distribution command $S_r$ does not change. In the embodiment, although the value of the flag as the distribution command $S_r$ is switched from "1 (100%)" to "0 (0%)" when the automatic driving control function is switched from the on-state to the off-state, the value of the flag as the distribution command $S_r$ is maintained at "1" because the gradual-change processing unit 91 is maintained in the wait state. After the wait state of the gradual-change processing unit 91 is cancelled because the wait time has elapsed since the switching of the automatic driving control function from the on-state to the off-state, the gradual-change processing unit 91 performs the gradual-change process for the value of the flag as the distribution command $S_r$, so that the value of the flag as the distribution command $S_r$ gradually changes from "1" to "0".

Next, the operation of the fifth embodiment will be described. As shown by "DURING AUTOMATIC DRIVING" in FIG. 8, when the automatic driving control is being executed, the steering wheel 11 is maintained in a state where the steering wheel 11 is withdrawn to the predetermined storage position in a vehicle cabin.

Figure 8:
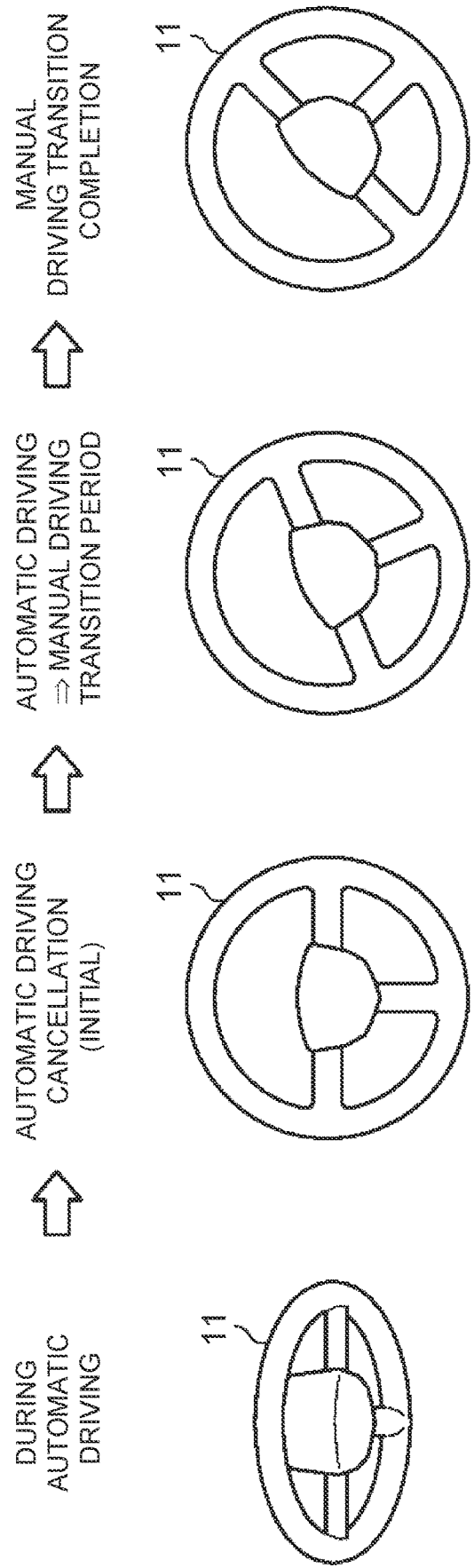
FIG. 8 is a front view showing a change in action of a steering wheel in a fifth embodiment of the steering control device.

As shown by "AUTOMATIC DRIVING CANCELLATION (INITIAL)" in FIG. 8, when the automatic driving control is cancelled through the operation of the switch provided at the driver's seat or the like, the steering wheel 11 starts to return from the storage position to the operation position, in response to the cancellation. Note that at this time, the steering wheel 11 does not rotate.

The reason is shown as follows. That is, since the gradual-change processing unit 91 is in the wait state, the value of the flag as the distribution command $S_r$ is kept at "1". Therefore, the value of the distribution ratio $DR_1$ for the command value $S^*$ is "1 (100%)", and the value of the distribution ratio $DR_2$ for the target steer angle $\theta^*$ computed by the target steer angle computation unit 74 is "0". Further, since the automatic driving control function has been switched from the on-state to the off-state, the value of the command value $S^*$ computed by the host control device 500 is "0". Incidentally, when a configuration in which the command value $S^*$ is not computed by the host control device 500 is employed, the multiplier 92 of the arrangement processing unit 90 handles the value of the command value $S^*$ as "0", in the case where the automatic driving control function is in the off-state. Accordingly, in the case where the gradual-change processing unit 91 is maintained in the wait state, the value of the final target steer angle $\theta^*$ computed by the adder 95 is "0".

As shown by "AUTOMATIC DRIVING-*MANUAL DRIVING TRANSITION PERIOD" in FIG. 8, the return of the steering wheel 11 to the operation position is competed at the timing when the time measured by the counter 91a reaches the wait time. Further, since the wait state of the gradual-change processing unit 91 is cancelled when the time measured by the counter 91a reaches the wait time, the gradual-change processing unit 91 starts the execution of the gradual-change process for the value of the flag as the distribution command $S_r$. As the value of the flag as the distribution command $S_r$ gradually changes from "1" to "0", the value of the distribution ratio $DR_1$ for the command value $S^*$ gradually decreases from "1" to "0", and the value of the distribution ratio $DR_2$ for the target steer angle $\theta^*$ computed by the target steer angle computation unit 74 gradually increases from "0" to "1". That is, the steer angle $\theta_s$ of the steering wheel 11 gradually approaches from the target steer angle $\theta^*$ (=0) at the time of the automatic driving to the target steer angle $\theta^*$ (the target steer angle $\theta^*$ computed by the target steer angle computation unit 74 in the embodiment) at the time of the manual driving.

Then, as shown by "MANUAL DRIVING TRANSITION COMPLETION" in FIG. 8, the value of the distribution ratio $DR_1$ for the command value $S^*$ reaches "0", and the value of the distribution ratio $DR_2$ for the target steer angle $\theta^*$ computed by the target steer angle computation unit 74 reaches "1". Thereby, the transition from the automatic driving control to the manual driving control is completed. At the timing of the completion of the transition, the steer angle $\theta_s$ of the steering wheel 11 coincides with the target steer angle $\theta^*$ (the target steer angle $\theta^*$ computed by the target steer angle computation unit 74 in the embodiment) at the time of the manual driving.

Accordingly, with the fifth embodiment, it is possible to obtain the following effects. In the case of employing the configuration of withdrawing the steering wheel 11 from the operation position to the storage position at the time of the execution of the automatic driving control, when the automatic driving control function has been switched from the on-state to the off-state, the final target steer angle $\theta^*$ is maintained at "0" in the period until the return of the steering wheel 11 from the storage position to the operation position is completed. Therefore, the steering wheel 11 is restrained from being needlessly rotated, in spite of a situation where the steering wheel 11 is not operated.

Further, when the automatic driving control function has been switched from the on-state to the off-state, the gradual-change processing unit 91 starts the execution of the gradual-change process for the value of the flag as the distribution command $S_r$, after of the completion of the return of the steering wheel 11 from the storage position to the operation position. As the value of the flag as the distribution command $S_r$ gradually changes from "1" to "0", the value of the distribution ratio $DR_2$ for the target steer angle $\theta^*$ computed by the target steer angle computation unit 74 gradually changes from "0" to "1". Thereby, the steer angle $\theta_s$ of the steering wheel 11 gradually approaches to the target steer angle $\theta^*$ computed by the target steer angle computation unit 74. Accordingly, it is possible to smoothly perform the switching from the automatic driving control to the manual driving control.

Next, a sixth embodiment in which the steering control device is embodied to a control device of an electric power steering apparatus (EPS) will be described. The same members as those in the first embodiment are denoted by identical reference characters, and detailed descriptions of the members are omitted.

In the EPS, the steering wheel 11 and turning wheels 16 shown in FIG. 1 are mechanically coupled to each other. That is, the steering shaft 12, the pinion shaft 13 and the turning shaft 14 function as a dynamic force transmission path between the steering wheel 11 and the turning wheels 16. The turning shaft 14 linearly moves due to the rotation operation of the steering wheel 11, so that the turning angle $\theta_w$ of the turning wheels 16 is altered. Further, the EPS includes an assist motor that is provided at the same position as the position of one of the reaction motor 31 and turning motor 41 shown in FIG. 1. The assist motor generates a steering assistance force (assist force).

Figure 9:
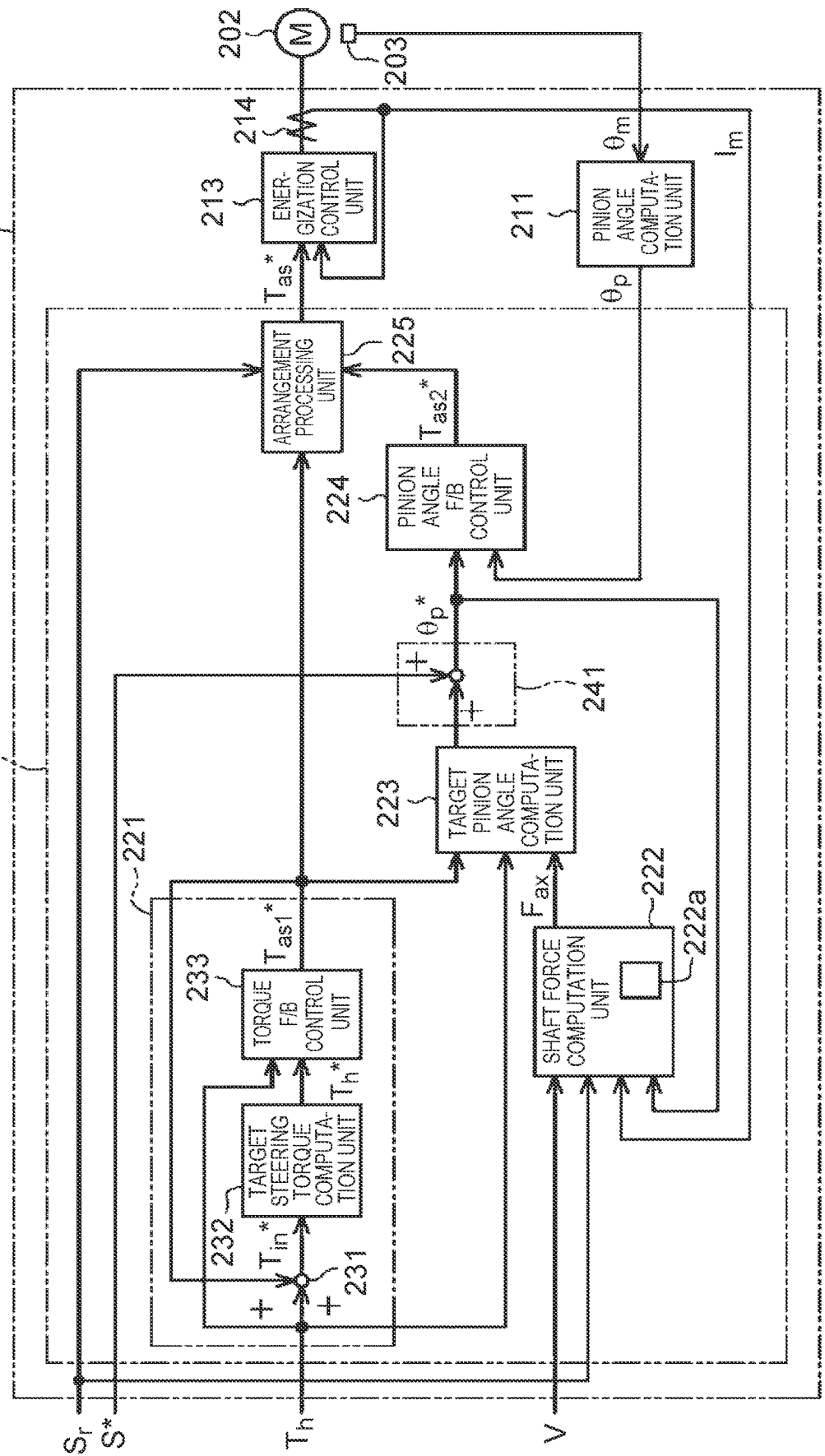
FIG. 9 is a control block diagram of a sixth embodiment of the steering control device that is equipped in an electric power steering apparatus.

As shown in FIG. 9, a control device 201 of an EPS 200 executes an assist control to generate a steering assistance force corresponding to the steering torque $T_h$ through an energization control for an assist motor 202. The control device 201 controls electricity supply for the assist motor 202, based on the steering torque $T_h$ detected through the torque sensor 34, the vehicle speed V detected through the vehicle speed sensor 501 and a rotation angle $\theta_m$ detected through a rotation angle sensor 203 that is provided on the assist motor 202.

The control device 201 includes a pinion angle computation unit 211, an assist command value computation unit 212 and an energization control unit 213. The pinion angle computation unit 211 takes in the rotation angle $\theta_m$ of the assist motor 202, and computes the pinion angle $\theta_p$ that is the rotation angle of the pinion shaft 13, based on the taken rotation angle $\theta_m$. The assist command value computation unit 212 computes an assist command value $T_{as}^*$ based on the steering torque $T_h$ and the vehicle speed V. The assist command value $T_{as}^*$ is a command value indicating an assist torque that is a rotation force to be generated by the assist motor 202. The energization control unit 213 supplies an electric power corresponding to the assist command value $T_{as}^*$, to the assist motor 202. A current sensor 214 is provided on an electricity supply path to the assist motor 202. The current sensor 214 detects an electric current value $I_m$ as the value of the actual electric current that is supplied to the assist motor 202.

Next, the configuration of the assist command value computation unit 212 will be described in detail. The assist command value computation unit 212 includes an assist torque computation unit 221, a shaft force computation unit 222, a target pinion angle computation unit 223, a pinion angle feedback control unit (pinion angle F/B control unit) 224, and an arrangement processing unit 225.

The assist torque computation unit 221 computes a first assist torque $T_{as1}^*$ based on the steering torque $T_h$. The assist torque computation unit 221 includes an adder 231, a target steering torque computation unit 232 and a torque feedback control unit 233. The adder 231 computes the input torque $T_{in}^*$ as the torque that is applied to the steering shaft 12, by adding the steering torque $T_h$ detected through the torque sensor 34 and the first assist torque $T_{as1}^*$ computed by the torque feedback control unit 233. The target steering torque computation unit 232 computes the target steering torque $T_h^*$ based on the input torque $T_{in}^*$ computed by the adder 231. The target steering torque computation unit 232 computes the target steering torque $T_h^*$ having a larger absolute value, as the absolute value of the input torque $T_{in}^*$ is larger. The torque feedback control unit 233 takes in the steering torque $T_h$ detected through the torque sensor 34 and the target steering torque $T_h^*$ computed by the target steering torque computation unit 232. The torque feedback control unit 233 computes the first assist torque $T_{as1}^*$ through the feedback control (PID control) of the steering torque $T_h$, such that the steering torque $T_h$ detected through the torque sensor 34 follows up the target steering torque $T_h^*$.

Incidentally, the following configuration may be employed as the assist torque computation unit 221. That is, the assist torque computation unit 221 computes the first assist torque $T_{as1}^*$, using a three-dimensional map that specifies the relation between the steering torque $T_h$ and the first assist torque $T_{as1}^*$ depending on the vehicle speed V, instead of the feedback control of the steering torque $T_h$. The assist torque computation unit 221 sets the absolute value of the first assist torque $T_{as1}$ to a larger value, as the absolute value of the steering torque $T_h$ is larger and the vehicle speed V is lower.

The shaft force computation unit 222 has the same function as the shaft force computation unit 73 in the first embodiment shown in FIG. 4. The shaft force computation unit 222 takes in the electric current value $I_m$ of the assist motor 202 detected through the current sensor 214, the target pinion angle $\theta_p^*$ computed by the target pinion angle computation unit 223, and the vehicle speed V detected through the vehicle speed sensor 501. The shaft force computation unit 222 computes the shaft force $F_{ax}$ that acts on the turning shaft 14, based on the electric current value $I_m$ of the assist motor 202, the target pinion angle $\theta_p^*$ and the vehicle speed V. Further, the shaft force computation unit 222 includes a gradual-change processing unit 222a. The gradual-change processing unit 222a has the same function as the gradual-change processing unit 84 shown in FIG. 4. The gradual-change processing unit 222a performs a gradual-change process (a process for gradual change) with respect to time for the value of the flag as the distribution command $S_r$ ("0" or "1" in the embodiment).

The target pinion angle computation unit 223 has the same function as the target steer angle computation unit 74 in the first embodiment shown in FIG. 3. The target pinion angle computation unit 223 computes the target pinion angle $\theta_p^*$ based on the ideal model expressed by Expression (A), using the first assist torque $T_{as1}^*$ computed by the assist torque computation unit 221, the steering torque $T_h$ detected through the torque sensor 34, and the shaft force $F_{ax}$ computed by the shaft force computation unit 222.

The pinion angle feedback control unit 224 has the same function as the steer angle feedback control unit 75 in the first embodiment shown in FIG. 3. The pinion angle feedback control unit 224 takes in each of the target pinion angle $\theta_p^*$ calculated by the target pinion angle computation unit 223 and the actual pinion angle $\theta_p$ calculated by the pinion angle computation unit 211. The pinion angle feedback control unit 224 performs a PID control (a proportional control, an integral control or a derivative control), as a feedback control of the pinion angle $\theta_p$, such that the actual pinion angle $\theta_p$ follows up the target pinion angle $\theta_p^*$. That is, the pinion angle feedback control unit 224 determines the deviation between the target pinion angle $\theta_p^*$ and the actual pinion angle $\theta_p$, and computes a second assist torque $T_{as2}^*$ such that the deviation is eliminated.

The arrangement processing unit 225 has the same function as the arrangement processing unit 76 in the first embodiment shown in FIG. 3. The arrangement processing unit 225 takes in the first assist torque $T_{as1}^*$ computed by the torque feedback control unit 233, the second assist torque $T_{as2}^*$ computed by the pinion angle feedback control unit 224, and the distribution command $S_r$ computed by the host control device 500. The arrangement processing unit 225 computes the assist command value $T_{as}^*$ based on the first assist torque $T_{as1}^*$ and the second assist torque $T_{as2}^*$, depending on the distribution command $S_r$.

The energization control unit 213 computes a current command value for the assist motor 202, based on the assist command value $T_{as}^*$. Further, the energization control unit 213 takes in the electric current value $I_m$ detected through the current sensor 214. Then, the energization control unit 213 determines the deviation between the current command value and the actual electric current value $I_m$, and controls the electricity supply for the assist motor 202 such that the deviation is eliminated. Thereby, the assist motor 202 generates a torque corresponding to the assist command value $T_{as}^*$. That is, the steering assist corresponding to the steering state is performed.

In the control device 201, the following configuration may be provided instead of the gradual-change processing unit 222a of the shaft force computation unit 222, or in addition to the gradual-change processing unit 222a. As shown by a two-dot chain line in FIG. 9, the control device 201 may include an arrangement processing unit 241. The arrangement processing unit 241 has the same function as the arrangement processing unit 90 in the third embodiment shown in FIG. 6. The arrangement processing unit 241 takes in the target pinion angle $\theta_p^*$ computed by the target pinion angle computation unit 223, the command value S* computed by the host control device 500, and the distribution command $S_r$. The arrangement processing unit 241 computes the final target pinion angle $\theta_p^*$ based on the target pinion angle $\theta_p^*$ and the command value S*, depending on the distribution command $S_r$.

Accordingly, with the sixth embodiment, it is possible to obtain the following effects. When the driving assist control function or the automatic driving control function is switched between the on-state and the off-state, a rapid change in the final shaft force $F_{ax}$ is restrained through the execution of the gradual-change process for the distribution ratio $S_r$ by the gradual-change processing unit 222a. That is, rapid changes in the target pinion angle $\theta_p^*$, the second assist torque $T_{as2}^*$, the assist command value $T_{as}^*$ and furthermore the assist force that is given to the steering wheel 11 are restrained. Therefore, the driver is unlikely to have a strangeness feeling due to the change in the assist force. Further, it is possible to smoothly perform the switching between the manual driving and the driving assist or the switching between the manual driving and the automatic driving.

In the case where the control device 201 includes the arrangement processing unit 241, it is possible to obtain the following effects also. That is, when the driving assist control function or the automatic driving control function is switched between the on-state and the off-state, rapid changes in the distribution ratio for the command value S* and the distribution ratio for the target pinion angle $\theta_p^*$ computed by the target pinion angle computation unit 223 are restrained through the execution of the gradual-change process for the distribution ratio $S_r$ by the arrangement processing unit 241. Therefore, a rapid change in the final target pinion angle $\theta_p^*$ that is used in the pinion angle feedback control unit 224 is restrained, and furthermore a rapid change in the assist force that is given to the steering wheel 11 is restrained. Accordingly, the assist force that is given to the steering wheel 11 gradually changes, and thereby the driver is unlikely to have the strangeness feeling due to the change in the assist force. Further, it is possible to smoothly perform the switching between the manual driving and the driving assist or the switching between the manual driving and the automatic driving.

The above embodiments may be carried out while being modified as follows. In the first to fifth embodiments, a clutch may be provided in the steering apparatus 10. In this case, as shown by a two-dot chain line in FIG. 1, the steering shaft 12 and the pinion shaft 13 are coupled through a clutch 21. As the clutch 21, an electromagnetic clutch that connects and disconnects dynamic force by electric connection and disconnection of an exciting coil is employed. The control device 50 executes a connection-disconnection control to switch the clutch 21 between connection and disconnection. When the clutch 21 is disconnected, the dynamic force transmission between the steering wheel 11 and the turning wheels 16 is mechanically disconnected. When the clutch 21 is connected, the dynamic force transmission between the steering wheel 11 and the turning wheels 16 is mechanically connected.

In the first to fifth embodiments, at least one of shaft forces (c1) to (c4) described below may be used as the estimated shaft force that is computed by the shaft force computation unit 73, in addition to the estimated shaft force F2 or instead of the estimated shaft force F2. The same goes for the shaft force computation unit 222 in the sixth embodiment.

(c1) An estimated shaft force that is computed based on at least one of the lateral acceleration and the yaw rate (c2) A shaft force that is detected through a shaft force sensor (c3) A tire force that is detected through a tire force sensor, or a tire shaft force that is computed based on the tire force (c4) An estimated shaft force that is obtained by summing up values resulting from multiplying the estimated shaft force F2, the mixed shaft force F3 and the estimated shaft force F4 by predetermined distribution ratios that are individually set.

In the first to sixth embodiments, one of the ideal shaft force F1, the estimated shaft force F2 and the forces (c1) to (c4) may be used as the final shaft force $F_{ax}$.

In the first to sixth embodiments, the host control device 500 may compute an additional torque command value as the command value S*, instead of the additional angle command value. In this case, the steering reaction force command value computation unit 52 in the first to fifth embodiments and the assist command value computation unit 212 in the sixth embodiment may convert the additional torque command value into the additional angle command value, and may use the additional angle command value after the conversion. Each of the steering reaction force command value computation unit 52 and the assist command value computation unit 212 is provided with a conversion unit that converts the additional torque command value into the additional angle command value.

In the first to fifth embodiments, a configuration of excluding the arrangement processing unit 76 shown in FIG. 3 may be employed as the steering reaction force command value computation unit 52. In this case, the second steering reaction force command value $T_2^*$ computed by the steer angle feedback control unit 75 is used as the steering reaction force command value $T^*$. Further, in the sixth embodiment, a configuration of excluding the arrangement processing unit 225 shown in FIG. 9 may be employed as the assist command value computation unit 212. In this case, the second assist torque $T_{as2}^*$ computed by the pinion angle feedback control unit 224 is used as the assist command value $T_{as}$.

In the first embodiment, the multiplication by the automatic driving rate $DR_a$ computed by the gradual-change processing unit 84 of the shaft force computation unit 73 may be performed not for the mixed shaft force F3 computed by the distribution computation unit 83, but for a state variable that is used for the computation of the ideal shaft force F1 or the estimated shaft force F2, that is, the target steer angle $\theta^*$ as the target pinion angle $\theta_p^*$, or the electric current value $I_b$ of the turning motor 41. The same goes for the gain $G_f$ that is computed by the gain computation unit 86 in the second embodiment. The above descriptions can be similarly applied to the shaft force computation unit 222 in the sixth embodiment.

What is claimed is:

1. A steering apparatus of a vehicle comprising:
   a steering mechanism including a turning shaft by which a turning wheel is turned;
   a motor configured to apply a drive force to the steering mechanism;
   a host controller mounted on the vehicle; and
   a controller configured to control the motor based on a command value that is computed depending on a steering state, the controller including an electronic control unit (ECU) configured to:
   compute a shaft force to be reflected in the command value, depending on the steering state, the shaft force acting on the turning shaft,
   compute an intervention value indicating a degree of intervention in a steering control by the host controller by performing a gradual-change process for a distribution command value that is generated by the host controller when the host controller intervenes in the steering control such that the intervention value gradually changes with respect to time, and
   compute a final shaft force to be reflected in the command value using the intervention value and the computed shaft force.

2. The steering apparatus according to claim 1, wherein the ECU is further configured to:
   compute an automatic driving rate, as the intervention value indicating the degree of the intervention in the steering control by the host controller, and
   compute the final shaft force to be reflected in the command value, by using the automatic driving rate or a gain corresponding to the automatic driving rate and the computed shaft force.

3. The steering apparatus according to claim 1, wherein the ECU is further configured to:
   compute a target rotation angle of the turning shaft based on the steering state and the computed final shaft force, the steering state depending on an operation of a steering wheel,
   compute a first distribution ratio for a host command value by performing the gradual-change process for the distribution command value and a second distribution ratio for the computed target rotation angle such that the first distribution ratio and the second distribution ratio gradually change with respect to time, the host command value being generated when the host controller intervenes in the steering control,
   compute a final target rotation angle of the turning shaft using a value obtained from the first distribution ratio and the host command value and a value obtained from the second distribution ratio and the computed target rotation angle, and
   compute a command value component to be reflected in the command value using a feedback control to cause an actual rotation angle of the turning shaft to coincide with the computed final target rotation angle of the turning shaft.

4. The steering apparatus according to claim 1, wherein:
   the steering mechanism includes a steering shaft that rotates in conjunction with an operation of a steering wheel, a dynamic force transmission between the steering wheel and the turning shaft being isolated; and
   the motor is a reaction motor that generates a steering reaction force as the drive force that is applied to the steering shaft, the steering reaction force being a torque in an opposite direction of a steering direction.

5. The steering apparatus according to claim 1, wherein:
   the steering mechanism includes a steering shaft that rotates in conjunction with an operation of a steering wheel and that functions as a dynamic force transmission path between the steering wheel and the turning shaft; and
   the motor is an assist motor that is configured to generate a steering assistance force as the drive force that is applied to the steering shaft or the turning shaft, the steering assistance force being a torque in the same direction as a steering direction.

* * * * *